United States Patent

Burkhart et al.

[11] Patent Number: 5,844,010
[45] Date of Patent: Dec. 1, 1998

[54] METHOD OF PREPARING POLYURETHANE FOAM UTILIZING BLOCK COPOLYMERS HAVING LINKED SILOXANE BLOCKS

[75] Inventors: Georg Burkhart, Essen; Rolf-Dieter Langenhagen, Hattingen; Andreas Weier, Essen, all of Germany

[73] Assignee: Th. Goldschmidt AG, Essen, Germany

[21] Appl. No.: 869,550

[22] Filed: Jun. 5, 1997

[30] Foreign Application Priority Data

Mar. 29, 1997 [DE] Germany .................. 197 13 277.4

[51] Int. Cl.⁶ ..................................... C08G 18/48
[52] U.S. Cl. ................ 521/112; 528/29; 528/35
[58] Field of Search .............. 521/112; 528/28, 528/35

[56] References Cited

U.S. PATENT DOCUMENTS

| | | | |
|---|---|---|---|
| 5,492,939 | 2/1996 | Stanga et al. | 521/112 |
| 5,525,640 | 6/1996 | Gerkin et al. | 521/112 |
| 5,650,449 | 7/1997 | Mokund et al. | 521/112 |

*Primary Examiner*—Morton Foelak
*Attorney, Agent, or Firm*—Anderson, Kill & Olick, P.C.

[57] ABSTRACT

The invention relates to the use of block copolymers having linked siloxane blocks of the general average formula

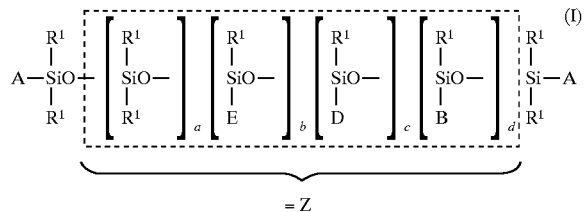

as additive in the production of polyurethane foams.

7 Claims, No Drawings

METHOD OF PREPARING POLYURETHANE FOAM UTILIZING BLOCK COPOLYMERS HAVING LINKED SILOXANE BLOCKS

The invention relates to a method of preparing polyurethane foam utilizing block copolymers having linked siloxane blocks as additives in the production of polyurethane foams.

In the production of polyurethane foams, the mixture of the raw materials has added to it polysiloxane-polyoxyalkylene block copolymers which have a variety of functions and, inter alia, make possible the formation of a uniform cell structure and stabilize the foam structure formed until the reaction is complete. However, not all polysiloxane-polyoxyalkylene block copolymers are equally well suited. In order to be usable as polyurethane foam stabilizers, the polyoxyalkylene blocks and the polysiloxane block of the block copolymers have to be present in a balanced ratio, with the build-up of the two blocks also being of great importance. For the build-up of a very effective foam stabilizer, there are many variables both for the polyoxyalkylene block and for the polysiloxane block:

The polyoxyalkylene block can be composed of various oxy-alkylene units, primarily of oxyethylene, oxypropylene and oxybutylene units. It is here possible to vary the weight ratio of these units to one another, their sequence and also the molecular weight of the polyoxyalkylene block. Also of importance is the end group of the polyoxyalkylene block which can be reactive (e.g. OH group) or inert (e.g. alkoxy group) in respect of polyurethane formation. The polyoxyalkylene block can be linked to the polysiloxane block by means of a hydrolytically stable C-Si bond or the less hydrolytically stable C-O-Si bond. Different polyoxyalkylene blocks can also be bound to the polysiloxane block.

The polysiloxane block can be varied in respect of type and proportion of the Si units. The siloxane block can be linear or branched and have a different molecular weight. The polyoxyalkylene blocks can be bound at the end and/or laterally to the polysiloxane block.

Predictions as to the effectiveness of a polysiloxane-polyoxyalkylene block copolymer as foam stabilizer can only be made to a limited extent. Those skilled in the art therefore have to test the possible variations largely empirically. In view of the large, almost incalculable number of possible variations, finding specific structural parameters and corresponding block copolymers which are particularly effective for the purposes of polyurethane production represents an advance in the art and thus an inventive step.

Polysiloxane-polyoxyalkylene block copolymers which have different polyoxyalkylene radicals in the average molecule have already been described repeatedly. Among the large number of corresponding publications, the following documents may be mentioned by way of example:

DE-C-15 70 647: chloropolysiloxanyl sulfates are reacted with mixtures of alkylene oxide adducts which comprise from 50 to 96 OH-equivalent percent of polyalkylene glycol monoethers which comprise ethylene oxide and propylene oxide units, contain from 40 to 70% by weight of oxypropylene units and have a molecular weight of from 1000 to 3000 and whose hydroxyl groups are preferably secondary, and from 5 to 50 OH-equivalent percent of alkylene oxide adducts of polyfunctional hydroxyl compounds which have a molecular weight of from 130 to 3500, whose polyalkylene glycol components comprise ethylene oxide and/or propylene oxide units and which have an OH-equivalent weight of up to 1750 and whose hydroxyl groups are preferably secondary, where the mixing ratios are selected such that at most 1.4, preferably from 1.05 to 1.2, OH-equivalents are employed per acid equivalent of the chloropolysiloxanyl sulfate.

DE-C-16 94 366: as foam stabilizers, use is made of polysiloxane-polyoxyalkylene block copolymers whose polysiloxane block is built up in a manner known per se but whose polyoxyalkylene block comprises from 25 to 70% by weight of a polyoxyalkylene having an average molecular weight of from 1600 to 4000 and an ethylene oxide content of from 20 to 100% by weight, remainder propylene oxide and possibly higher alkylene oxides, and from 30 to 75% by weight of a polyoxyalkylene having an average molecular weight of from 400 to 1200 and an ethylene oxide content of from 65 to 100% by weight, remainder propylene oxide and possibly higher alkylene oxides.

DE-A-25 41 865: the polyoxyalkylene blocks of the polysiloxane-polyoxyalkylene block copolymers are defined such that one polyoxyalkylene block has a mean molecular weight of from 900 to 1300 and comprises from 30 to 55% by weight of ethylene oxide, remainder propylene oxide, and the other polyoxyalkylene block has a mean molecular weight of from 3800 to 5000 and comprises from 30 to 50% by weight of ethylene oxide, remainder propylene oxide.

EP-A-0 275 563: the block copolymer described in this patent application comprises three different polyoxyalkylene blocks, namely a block containing from 20 to 60% by weight of oxyethylene units and having a molecular weight of from 3000 to 5000, a further block containing from 20 to 60% by weight of oxyethylene units and having a molecular weight of from 800 to 2900 and a third block consisting of only polyoxypropylene units and having a molecular weight of from 130 to 1200.

Despite the wide range of available products which can be prepared according to the prior art, there is still a need for further optimization for the preparation of additives for the production of polyurethane foams. This need for optimization results, on the one hand, from the many possible types of polyurethane foam, e.g. flexible foam, rigid foam, ester foam, cold-cure foam, packaging foam, flame-laminatable foam, molded foam, integral foam, etc., and, on the other hand, from more recent foaming techniques such as variable pressure foaming, foaming using pressurized inert gases or 'forced cooling processes' (e.g. ENVIRO-CURE, CRAIN INDUSTRIES).

It has now astonishingly been found that the use of interrupted siloxane blocks as polyurethane foam stabilizers gives an unexpected combination of excellent properties if the siloxane blocks are also modified laterally. Such structures are obtained by linking (coupling) siloxane segments by means of diolefins or polyolefins which themselves may be linear or branched and can contain hetero atoms. The lateral modification of the siloxane chains in particular offers the opportunity not only of using chemically very different coupling agents for the hydrolysis-stable SiC linkage of the siloxane chains employed but also to match the property profile extremely well to requirements. This point in particular clearly distinguishes the present invention from, for example, JP-A 7-90102 which proposes linear siloxane-polyoxyalkylene (AB)$_n$ block copolymers for producing polyurethane foam. That publication draws particular attention to the necessary ratio of the molar masses, and thus polarities, between siloxane backbone and coupling substance, while in the case of the present invention it is, astonishingly, possible to use both such nonpolar coupling substances such as 1,7-octadiene and also significantly more polar structures, even OH-containing molecules such as trimethylolpropane diallyl ether, with excellent results because of the significantly different siloxane base structure.

This improvement in the properties is achieved if, according to the invention, the production of polyurethane foams is carried out using as additive block copolymers which correspond to the following general average formula:

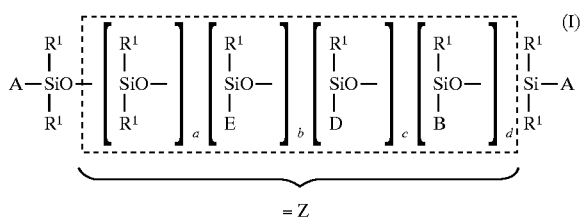

where the radicals and indices can have the following meanings: A=radical $R^1$, radical E or a radical of the formula IIa

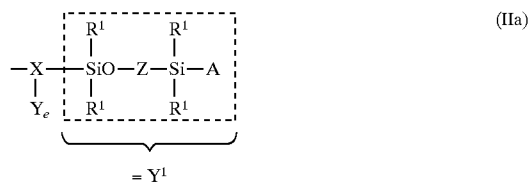

or a radical of the formula IIb

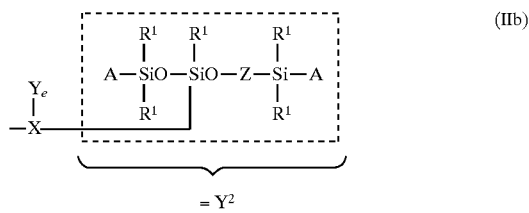

B=radical of the formula IIa or IIb,
Y=radical $Y^1$ or radical $Y^2$,
D=radical of the formula

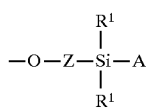

$R^1$=an unsubstituted or substituted alkyl radical having from 1 to 30 carbon atoms, an unsubstituted or substituted aryl radical or an unsubstituted or substituted alkaryl radical, but with at least 80% of the radicals $R^1$ being methyl groups,
a is from 3 to 200,
b is from 0 to 50,
c is from 0 to 10,
d is from 0 to 5 and
e is from 0 to 4,
where the values of a, b, c, d and e in the individual segments A, B, D and Z can be different and at least one of b or c is not equal to 0,
E=a radical of the general formula

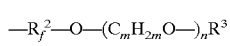

where $R^2$ is a divalent alkyl radical which may also be branched and f is 0 or 1, m has an average value of from 2 to 4, n is from 0 to 100 and $R^3$ is hydrogen, an unsubstituted or substituted alkyl radical having from 1 to 6 carbon atoms, an acyl radical or a —O—CO—NH—$R^4$ radical in which $R^4$ is an unsubstituted or substituted alkyl or aryl radical, X=a polyvalent organic radical.

It is here also possible to use various polyethers in combination, as is described, for example, in DE-C-42 29 402. The polyethers can, for example, differ in their molar mass, their end group $R^3$, the proportions of monomers used, the type of monomers, etc.

X is a polyvalent organic radical (valence=2+e). The radical X is formed by the reaction of compounds containing 2+e hydrosilylable olefinic double bonds per molecule with SiH groups. At least one radical X has to be present per molecule of the substances to be used according to the invention. The molecule obtained by linkage should contain ≦600 Si atoms.

It is obvious to those skilled in the art that the compounds obtained are in the form of a mixture whose distribution is essentially determined by statistical rules. The values of a, b, c, d, n and the number of X radicals per molecule therefore represent mean values.

A small proportion of the radicals $R^1$ can be hydrogen, namely when the hydrogen-siloxane used does not react completely with the allyl polyethers and the organic compounds which form the bridge X.

X can be, for example, a bridge of the formula

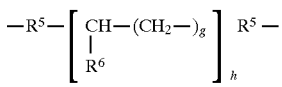

where $R^5$ is a divalent alkyl radical which may also be branched and $R^6$ is hydrogen, a linear or branched alkyl radical or the radical $R^5$ and g is from 0 to 5 and h is from 0 to 4, or the formula

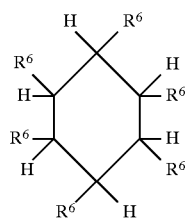

where $R^6$ is as defined above, or the formula

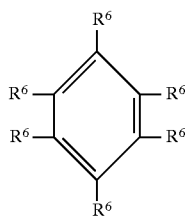

where $R^6$ is as defined above,
or the formula

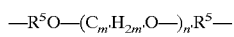

where
$R^5$ is as defined above,
m' is from 2 to 4 and
n' is from 0 to 20,
or the formula

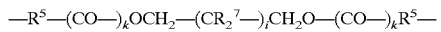

where
$R^5$ is as defined above and
$R^7$ is hydrogen, an alkyl radical, a hydroxyalkyl radical or the radical $-CH_2O-(CO-)_k R^5-$ and i is from 0 to 10 and
k is 0 or 1,
or the formula

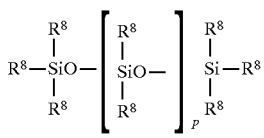

where
$R^8$ is an alkyl radical, a substituted alkyl radical, a phenyl radical or the radical $R^5$ and
p is from 0 to 10, with the value 0 being preferred.

The sum of the $R^5$ radicals per X radical has to be 2+e. $R^5$ is preferably the radical $-(CH_2)_2-$ or $-(CH_2)_3-$.

The radical $R^8$ is preferably an alkyl radical having from 1 to 6 carbon atoms, particularly preferably a methyl radical.

Examples of substances with which the radical X can be formed are 1,7-octadiene, trimethylolpropane diallyl ether, trimethylolpropane triallyl ether, pentaerythritol triallyl ether, divinylbenzene, divinylcyclohexane, 1,4-butanediol divinyl ether, diallyl polyether and 1,3-divinyl tetramethyl-disiloxane.

Examples of the linked polysiloxane block copolymers used according to the invention are:

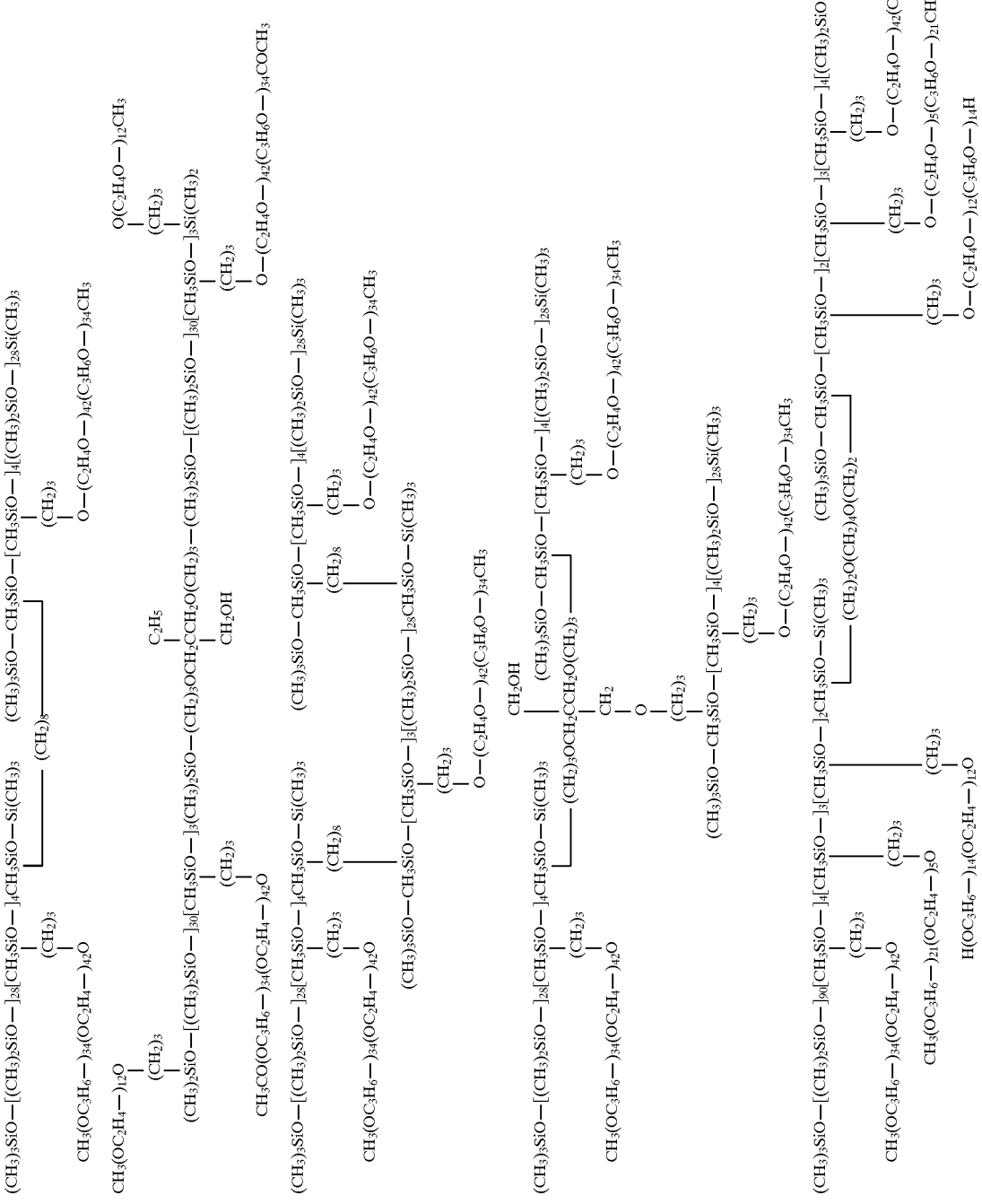

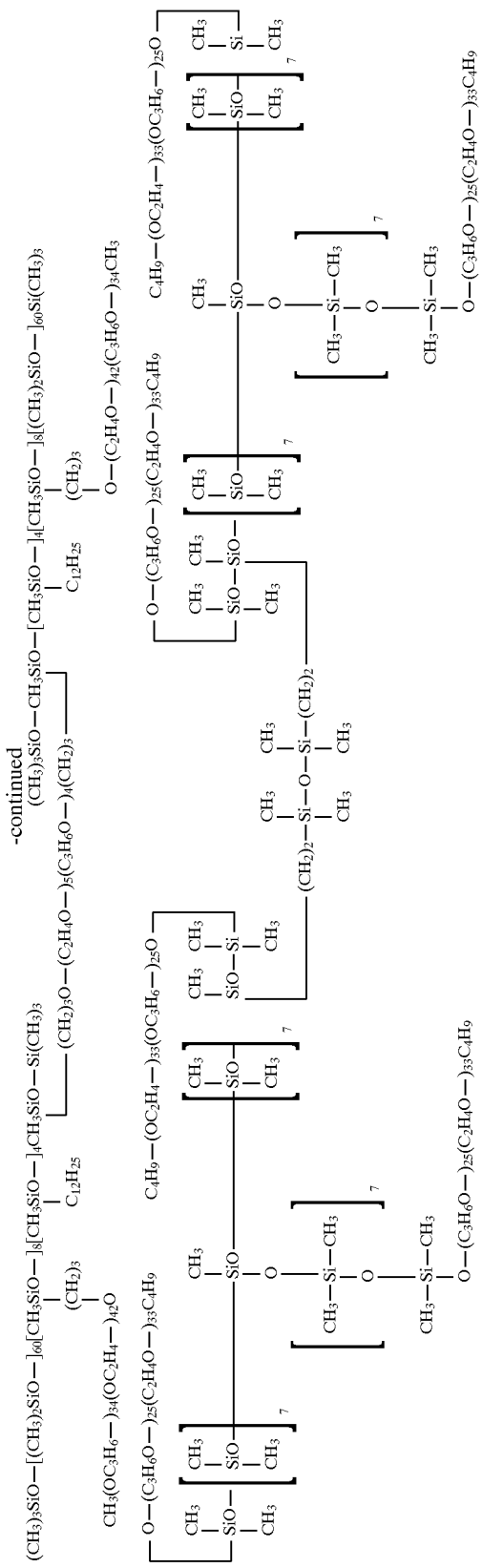

In the preparative examples below, the following compounds are used:

Siloxanes:

I) $(CH_3)_3SiO-[(CH_3)_2SiO-]_{28}[(CH_3)HSiO-]_5Si(CH_3)_3$

II) $H(CH_3)_2SiO-[(CH_3)_2SiO-]_{30}[(CH_3)HSiO-]_3Si(CH_3)_2H$

III) $(CH_3)_3SiO-[(CH_3)_2SiO-]_{58}[(CH_3)HSiO-]_{10}Si(CH_3)_3$

IV) $(CH_3)_3SiO-[(CH_3)_2SiO-]_{58}[(CH_3)HSiO-]_6Si(CH_3)_3$

V) $H(CH_3)_2SiO-[(CH_3)_2SiO-]_{19}[(CH_3)HSiO-]_4Si(CH_3)_2$

VI) $H(CH_3)_2SiO-[(CH_3)_2SiO-]_{40}[(CH_3)HSiO-]_8Si(CH_3)_2H$

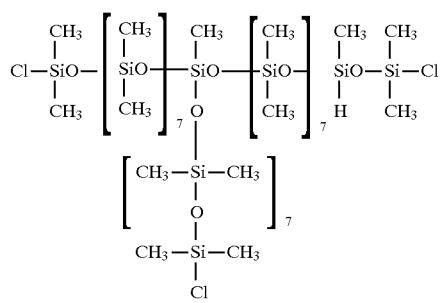

VII)

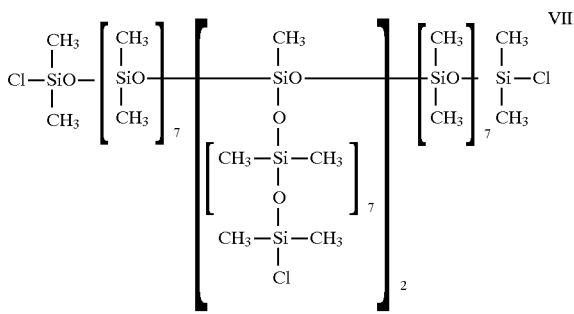

VIII)

Polyethers:

a) $CH_2=CH-CH_2O-(C_2H_4O-)_{12}CH_3$ b) $CH_2=CH-CH_2O-(C_2H_4O-)_{11}(C_3H_6O-)_1H$ c) $CH_2=CH-CH_2O-(C_2H_4O-)_{12}(C_3H_6O-)_9H$ d) $CH_2=CH-CH_2O-(C_2H_4O-)_{16}(C_3H_6O-)_{12}CH_3$ e) $CH_2=CH-CH_2O-(C_2H_4O-)_5(C_3H_6O-)_{21}CH_3$ f) $CH_2=CH-CH_2O-(C_2H_4O-)_{42}(C_3H_6O-)_{34}COCH_3$ g) $CH_2=CH-CH_2O-(C_2H_4O-)_{45}(C_3H_6O-)_{34}CH_3$ h) $CH_2=CH-CH_2O-(C_2H_4O-)_{45}(C_3H_6O-)_{34}H$ i) $C_4H_9O-(C_2H_4O-)_{33}(C_3H_6O-)_{25}H$

Coupling components:
trimethylolpropane diallyl ether
1,7-octadiene
1, 3-divinyltetramethyldisiloxane
diallyl polyether k),
formula: $CH_2=CH-CH_2O-(C_2H_4O-)_5(C_3H_6O-)_5CH_2-CH=CH_2$ Preparation of the block copolymers 1 to 16 and 19 to 21 (see Table 1)

A flask fitted with stirrer, thermometer, gas inlet and reflux condenser is charged with the siloxanes, polyethers and coupling components (for type and amount, see Table 1). Nitrogen is passed through the apparatus and the contents of the flask are heated to 105° C. while stirring. At 105° C., the initial charge is admixed with a 10% strength solution of $H_2PtCl_6·6H_2O$ in i-propanol (about 0.6 g per 1000 g of mixture). An exothermic reaction occurs. This results, depending on the starting materials used, in temperature increases of from 10° to 30° C. The mixtures are allowed to react to completion and SiH conversions of $\geq 97\%$ (determined via hydrogen which can be liberated using n-butanol in alkaline medium) are achieved. The initially turbid contents of the flask become clear during the reaction. The reaction times are generally from 1 to 8 hours.

The polyethers are preferably used in excess (from 10 to 40%). The above-described reaction can also be carried out with addition of solvents, which is advantageous particularly when relatively high-viscosity products are formed. It is here possible to use solvents which can be distilled off after the reaction (e.g. toluene, xylene) or ones which can remain in the end product after the reaction (e.g. dipropylene glycol, dipropylene and tripropylene glycol mono-n-butyl ether, propylene glycol monophenyl ether, polyethers which are free of double bonds).

Preparation of block copolymer 17 (see Table 1)

Stage 1: A flask fitted with stirrer, thermometer, gas inlet and reflux condenser is charged with the siloxane VII and the 1,7-octadiene (for amounts see table). Nitrogen is passed through the apparatus and the contents of the flask are heated to 105° C. while stirring. At 105° C., the initial charge is admixed with a 10% solution of $H_2PtCl_6·6H_2O$ in i-propanol (about 0.6 g per 1000 g of mixture). A slightly exothermic reaction occurs. The mixture is stirred until the SiH conversion has reached 97%.

Stage 2: A further flask fitted with stirrer, thermometer, gas inlet and distillation attachment is charged with the polyether i (for amount see Table 1) and 700 ml of toluene. Under a blanket of nitrogen, 150 ml of toluene are distilled off to achieve azeotropic drying of the polyether. After cooling to 60° C., the distillation attachment is replaced by a reflux condenser. The reaction product obtained in stage 1 is subsequently added to the polyether solution in toluene. After thorough mixing, ammonia gas is passed in at 60° C. until the contents of the flask give an ammoniacal reaction. The mixture is allowed to react further for one hour while passing in a slow stream of ammonia gas. The precipitated salt is then filtered off and the toluene is distilled off at 70° C. and 20 mbar.

Preparation of block copolymer 18 (see Table 1)

A flask fitted with stirrer, thermometer, gas inlet and distillation attachment is charged with the polyether i (for amount, see Table 1) and 700 ml of toluene. Under a blanket of nitrogen, 150 ml of toluene are distilled off to achieve azeotropic drying of the polyether. After cooling to 60° C., the distillation attachment is replaced by a reflux condenser. The siloxane VIII (for amount see Table 1) is subsequently added to the polyether solution in toluene. After thorough mixing, ammonia gas is passed in at 60° C. until the contents of the flask give an ammoniacal reaction. The mixture is allowed to react further for one hour while passing in a slow stream of ammonia gas. The precipitated salt is then filtered off and the toluene is distilled off at 70° C. and 20 mbar.

TABLE 1

| Block copolymer | X radicals per molecule | Siloxane/siloxane mixture Type | g | mol | Polyether/polyether mixture Type | g | mol | Coupling component | g | mol | Conversion in % | Category[1] |
|---|---|---|---|---|---|---|---|---|---|---|---|---|
| 1 | 0 | I | 50.8 | 0.020 | d) | 73.6 | 0.0500 | — | — | — | 99.2 | − |
|   |   |   |   |   | g) | 301.8 | 0.0750 |   |   |   |   |   |
| 2 | 1 | I | 50.8 | 0.020 | d) | 58.9 | 0.0400 | Trimethylolpropane diallyl ether | 2.1 | 0.0100 | 98.8 | + |
|   |   |   |   |   | g) | 241.4 | 0.0600 |   |   |   |   |   |
| 3 | 2 | I | 50.8 | 0.020 | d) | 53.9 | 0.0366 | Trimethylolpropane diallyl ether | 2.9 | 0.0133 | 99.6 | + |
|   |   |   |   |   | g) | 221.3 | 0.0550 |   |   |   |   |   |
| 4 | 0 | III | 50.6 | 0.010 | d) | 73.6 | 0.0500 | — | — | — | 100 | − |
|   |   |   |   |   | g) | 301.8 | 0.0750 |   |   |   |   |   |
| 5 | 0 | II | 50.8 | 0.020 | d) | 73.6 | 0.0500 | — | — | — | 98.7 | − |
|   |   |   |   |   | f) | 294.0 | 0.0750 |   |   |   |   |   |
| 6 | 1 | II | 50.8 | 0.020 | d) | 58.9 | 0.0400 | Trimethylolpropane diallyl ether | 2.1 | 0.0100 | 99.4 | + |
|   |   |   |   |   | f) | 235.2 | 0.0600 |   |   |   |   |   |
| 7 | 1 | I | 50.8 | 0.020 | d) | 58.9 | 0.0400 | 1,7-Octadiene | 1.1 | 0.1000 | 99.6 | + |
|   |   |   |   |   | g) | 241.4 | 0.0600 |   |   |   |   |   |
| 8 | 1 | II | 50.8 | 0.020 | d) | 58.9 | 0.0400 | 1,3-Divinyltetramethyl-disiloxane | 1.9 | 0.0100 | 98.9 | + |
|   |   |   |   |   | f) | 235.2 | 0.0600 |   |   |   |   |   |
| 9 | 1 | I | 50.8 | 0.020 | d) | 58.9 | 0.0400 | Diallyl polyether k) | 6.1 | 0.0100 | 98.3 | + |
|   |   |   |   |   | g) | 241.4 | 0.0600 |   |   |   |   |   |
| 10 | 1 | IV | 120.6 | 0.025 | a) | 9.3 | 0.0156 | Trimethylolpropane diallyl ether | 2.7 | 0.0125 | 100 | + |
|   |   |   |   |   | e) | 70.8 | 0.0469 |   |   |   |   |   |
|   |   |   |   |   | g) | 377.3 | 0.0938 |   |   |   |   |   |
| 11 | 1 | IV | 120.6 | 0.025 | a) | 9.3 | 0.0156 | 1,3-Divinyltetramethyl-disiloxane | 2.3 | 0.0125 | 99.8 | + |
|   |   |   |   |   | e) | 70.8 | 0.0469 |   |   |   |   |   |
|   |   |   |   |   | g) | 377.3 | 0.0938 |   |   |   |   |   |
| 12 | 2 | IV | 120.6 | 0.025 | a) | 8.8 | 0.0146 | Trimethylolpropane diallyl ether | 3.6 | 0.0167 | 98.4 | + |
|   |   |   |   |   | e) | 66.0 | 0.0437 |   |   |   |   |   |
|   |   |   |   |   | g) | 352.4 | 0.0876 |   |   |   |   |   |
| 13 | 2 | IV | 120.6 | 0.025 | a) | 8.8 | 0.0146 | 1,3-Divinyltetramethyl-disiloxane | 3.1 | 0.0167 | 99.0 | + |
|   |   |   |   |   | e) | 66.0 | 0.0437 |   |   |   |   |   |
|   |   |   |   |   | g) | 352.4 | 0.0876 |   |   |   |   |   |
| 14 | 0 | IV | 120.6 | 0.025 | a) | 11.3 | 0.0188 | — | — | — | 100 | − |
|   |   |   |   |   | e) | 84.9 | 0.0563 |   |   |   |   |   |
|   |   |   |   |   | g) | 452.7 | 0.1125 |   |   |   |   |   |
| 15 | 1 | IV | 120.6 | 0.025 | a) | 5.6 | 0.0094 | Trimethylolpropane diallyl ether | 2.7 | 0.0125 | 99.3 | + |
|   |   |   |   |   | d) | 55.2 | 0.0375 |   |   |   |   |   |
|   |   |   |   |   | e) | 117.8 | 0.0780 |   |   |   |   |   |
|   |   |   |   |   | h) | 125.6 | 0.0313 |   |   |   |   |   |
| 16 | 2 | I | 25.4 | 0.010 | d) | 14.7 | 0.0100 | Trimethylolpropane diallyl ether | 2.1 | 0.0100 | 98.6 | + |
|   |   | III | 25.3 | 0.005 | e) | 83.1 | 0.0550 |   |   |   |   |   |
|   |   |   |   |   | g) | 40.2 | 0.0100 |   |   |   |   |   |
|   |   |   |   |   | h) | 100.3 | 0.0250 |   |   |   |   |   |
| 17 | 1 | VII | 39.8 | 0.020 | i) | 214.3 | 0.0720 | 1,7-Octadiene | 1.2 | 0.0110 | 99.2 | + |
| 18 | 0 | VIII | 39.3 | 0.015 | i) | 214.3 | 0.0720 | — | — | — | — | − |
| 19 | 1 | V | 89.2 | 0.050 | b) | 56.3 | 0.0938 | Trimethylolpropane diallyl ether | 5.4 | 0.0250 | 99.5 | + |
|   |   |   |   |   | c) | 242.2 | 0.2186 |   |   |   |   |   |
| 20 | 0 | V | 89.2 | 0.050 | b) | 67.5 | 0.1125 | — | — | — | 100 | − |
|   |   |   |   |   | c) | 290.9 | 0.2625 |   |   |   |   |   |
| 21 | 0 | VI | 107.5 | 0.030 | b) | 67.5 | 0.1125 | — | — | — | 99.3 | − |
|   |   |   |   |   | c) | 290.9 | 0.2625 |   |   |   |   |   |

[1]+ means: block copolymer is according to the invention, − means: block copolymer is not according to the invention The block copolymers 1 to 18 are tested as additive in the flexible-foam formulations A and B.

| | Foam formulation A parts by weight | Foam formulation B parts by weight |
|---|---|---|
| Polyol (OHN: 47, 11% of EO) | 0 | 100 |
| Polyol (OHN: 56, 0% of EO) | 100 | 0 |
| Water | 4.05 | 5 |
| Tertiary amine | 0.2 | 0.15 |
| Tin octoate | 0.2 | 0.23 |
| Physical blowing agent | 3 | 5 |
| Stabilizer | varied | varied |
| Isocyanate T 80 | 52.5 | 63.04 |

The foaming of formulation A is carried out using 400 g of polyol; the foaming of formulation B is carried out using 300 g of polyol. The other formulation constituents are scaled accordingly.

To test the additive as stabilizer, polyol, water, amine, tin octoate, stabilizer and blowing agent are mixed while stirring well. After addition of the isocyanate, the mixture is stirred for 7 seconds at 3000 rpm and is poured into a paper-lined wooden box (base area 27 cm×27 cm). To test the additive in respect of other properties, e.g. as cell regulator, it is naturally also possible to make concomitant use of another stabilizer. The result is a foam on which the following data are measured to evaluate the stabilizer used:

1. The settling of the foam at the end of the rise phase (indicated as "settling" in the following tables).

2. The number of cells per centimeter of foam is counted under a microscope.

The results obtained using the foam formulations A and B are shown in Tables 2 to 6.

TABLE 2

Foaming using formulation A

| Copolymer/category | Parts by weight | Settling [cm] | Cells per cm |
|---|---|---|---|
| 1/− | 1.1/0.8/0.6 | 4.2/3.2/3.6 | 14/12/11 |
| 2/+ | 1.1/0.8/0.6 | 0.6/0.7/1.3 | 13/13/12 |
| 3/+ | 1.1/0.8/0.6 | 0.4/0.5/0.8 | 12/10/9 |
| 4/− | 1.1/0.8/0.6 | 1/1.2/1.4 | 9/9/9 |
| 7/+ | 1.1/0.8/0.6 | 0.9/1.3/1.5 | 15/13/12 |
| 9/+ | 1.1/0.8/0.6 | 0.5/1/1.3 | 12/11/11 |

The results show that, compared with the block copolymers 1 and 4 which are not according to the invention, the novel additive types 2 and 3 effect an otherwise unobtainable combination of low settling and good fine cellularity, as is also desired, for example, when the copolymers are employed as stabilizers in PU production using inert gases under pressure.

TABLE 3

Foaming using formulation B

| Copolymer/category | Parts by weight | Settling [cm] | Cells per cm |
|---|---|---|---|
| 1/− | 0.6/0.5 | 3.2/collapse | 12/— |
| 2/+ | 0.6/0.5 | 1/1.5 | 13/13 |
| 3/+ | 0.6/0.5 | 1/1.2 | 14/13 |
| 4/− | 0.6/0.5 | 1/1.3 | 9/9 |
| 7/+ | 0.6/0.5 | 1.7/2.5 | 14/13 |
| 9/+ | 0.6/0.5 | 1.9/3 | 13/13 |

Here too, the advantage of the novel products in polyurethane foaming is again apparent.

TABLE 4

Foaming using formulation A

| Copolymer/category | Parts by weight | Settling [cm] | Cells per cm |
|---|---|---|---|
| 1/− | 1.1/0.8/0.6 | 4.2/3.2/3.6 | 14/12/11 |
| 5/− | 1.1/0.8/0.6 | 1.8/3.0/7 | 15/15/14 |
| 6/+ | 1.1/0.8/0.6 | 0.4/0.7/0.9 | 16/13/13 |
| 8/+ | 1.1/0.8/0.6 | 0.4/0.8/1.1 | 15/15/14 |

Comparison of simultaneously end-modified and laterally modified structures also clearly shows, as for the substances from Table 2, the advantage of the products according to the invention in respect of the combination of positive properties in polyurethane foaming.

TABLE 5

Foaming using formulation B

| Copolymer/category | Parts by weight | Settling [cm] | Cells per cm |
|---|---|---|---|
| 10/+ | 0.6/0.5 | 0.3/0 | 14/14 |
| 11/+ | 0.6/0.5 | 0/0.3 | 14/13 |
| 12/+ | 0.6/0.5 | 0/0.3 | 14/14 |
| 13/+ | 0.6/0.5 | 0.2/0.4 | 14/14 |
| 14/− | 0.6/0.5 | 0.5/0.6 | 13/12 |

Comparison of the copolymer pairs 10 and 11 or 12 and 13 which are according to the invention shows, in comparison with copolymer 14, how freely the coupling component can be selected in terms of its polarity/structure.

Table 6 below shows some further structures (copolymers 15 to 17) which illustrate possibilities of the build-up principle; these should be regarded as non-limiting examples of the scope of the invention. The copolymer 17, in comparison with the copolymer 18 which is not according to the invention, makes clear the applicability of the build-up principle of siloxane coupling to structures in which the siloxanes are linked to polyethers via hydrolysis-unstable SiOC bonds.

TABLE 6

Foaming using formulation A

| Copolymer/category | Parts by weight | Settling [cm] | Cells per cm |
|---|---|---|---|
| 15/+ | 1.1/0.8/0.6 | 0.4/0.5/0.4 | 16/14/15 |
| 16/+ | 1.1/0.8/0.6 | 0/0/0 | 15/14/11 |
| 17/+ | 1.1/0.8/0.6 | 0.1/0.2/0.4 | 13/12/11 |
| 18/− | 1.1/0.8/0.6 | 0.2/0.3/0.4 | 10/9/8 |

The positive influences of the structural principle shown here are also apparent in very different applications. Thus, for example, testing of the block copolymers 19, 20 and 21 as additives in the rigid-foam formulation C demonstrates the advantages of such structures as rigid-foam stabilizers (for results, see Table 7). The use according to the invention of copolymer 19 leads, in contrast to the copolymers 20 and 21 which are not according to the invention, to an otherwise unobtainable advantageous combination of very good flowability and low surface and internal flaws.

| Foam formulation C | |
|---|---|
| | Parts by weight |
| Polyol (sugar/glycerol-initiated polyol, OHN: 500–520) | 96.5 |
| Water | 1 |
| Tertiary amine | 2.5 |
| Physical blowing agent | 30 |
| Stabilizer | 2 |
| Raw MDI (polymeric diphenylmethane 4,4'-diisocyanate having an isocyanate number of 31) | 148 |

Foaming of formulation C is carried out using 91 g of polyol. The other formulation constituents are scaled accordingly.

The rigid polyurethane foams are produced by customary methods in a board mold having the dimensions: length 145 cm, width 14 cm, thickness 3.5 cm. Polyol, water, amine, stabilizer and blowing agent are mixed well with stirring.

After addition of the isocyanate, the mixture is stirred for 6.5 seconds at 2500 rpm. The reaction mixture is then placed in the lower part of the board mold inclined at 150. To assess the flowability of the foam, the size of the foam batch is selected such that the board mold is underfilled. The following properties of the rigid-foam board produced are employed for evaluating the stabilizer used:

1. The length of the foam board as a measure of the flowability.
2. Surface flaws on the foam board obtained (grades for the evaluation: hardly any, slight, intermediate, great, very great).
3. Internal flaws in the cut-open foam board, recognizable as holes and dense areas (grades for the evaluation: hardly any, slight, intermediate, great, very great).

TABLE 7

Foaming using formulation C

| Copolymer/ category | Parts by weight | Flowability [cm] | Surface flaws | Internal flaws |
|---|---|---|---|---|
| 19/+ | 2 | 133 | slight-intermediate | slight-intermediate |
| 20/− | 2 | 129 | slight-intermediate | intermediate-great |
| 21/− | 2 | 131 | intermediate | slight-intermediate |

We claim:

1. A method of optimizing the properties of polyurethane foam utilizing block copolymers of the general average formula:

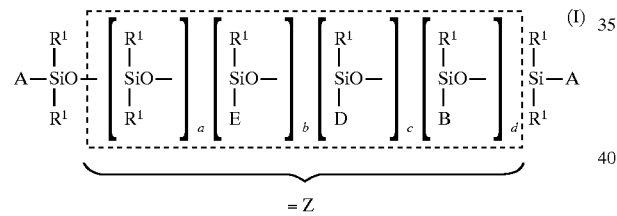

as an additive, where the groups and indices can have the following meanings:

A=$R^1$ group, an E group or a radical of the following formula IIa

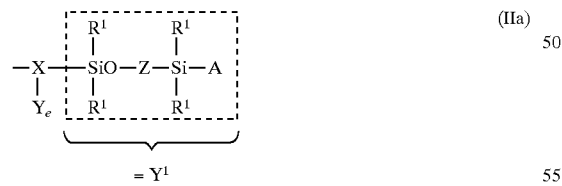

or a radical of the following formula IIb

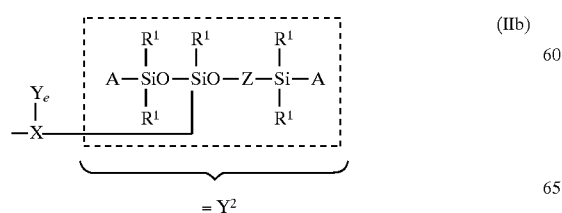

B=a group of formula IIa or IIb,
Y=$Y^1$=

or $Y^2$=

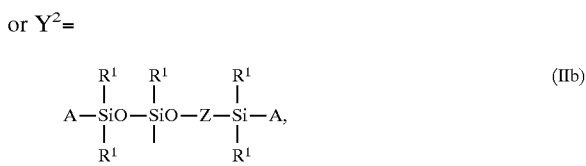

D=a group of the formula

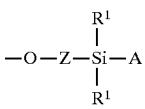

$R^1$=an unsubstituted or substituted alkyl group having from 1 to 30 carbon atoms, an unsubstituted or substituted aryl group or an unsubstituted or substituted alkaryl group, but with at least 80% of the $R^1$ groups being methyl groups,
a is from 3 to 200,
b is from 0 to 50,
c is from 0 to 10,
d is from 0 to 5 and
e is from 0 to 4,
where the values of a, b, c, d and e in the individual segments A, B, D and Z can be different and at least one of b or c is not equal to 0,
E=a group of the general formula;

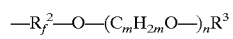

where
$R^2$ is a divalent alkyl group which may also be branched
f is 0 or 1;
m has an average value of from 2 to 4;
n is from 0 to 100;
$R^3$ is hydrogen, an unsubstituted or substituted alkyl group having from 1 to 6 carbon atoms, an acyl group or a —O—CO—NH—$R^4$ group in which $R^4$ is an unsubstituted or substituted alkyl or aryl group; and
X=a polyvalent organic group.

2. The method of claim 1, where
X is a bridge of the formula;

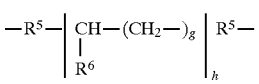

where
$R^5$ is a divalent alkyl group which may also be branched;
$R^6$ is hydrogen, a linear or branched alkyl group or an $R^5$ group;

g is from 0 to 5; and h is from 0 to 4.

3. The method of claim 1 where X is a bridge of the formula:

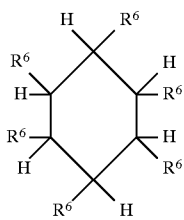

where

R$^6$ is hydrogen, a linear or branched alkyl group or an R$^5$ group.

4. The method of claim 1 where X is a bridge of the formula:

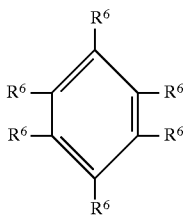

where

R$^6$ is hydrogen, a linear or branched alkyl group or an R$^5$ group.

5. The method of claim 1 where X is a bridge of the formula:

where

R$^5$ is a divalent alkyl group which may be branched;

m' is from 2 to 4 and n' is from 0 to 20.

6. The method of claim 1 where X is a bridge of the formula:

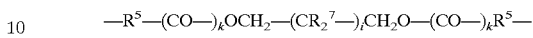

where

R$^5$ is a divalent alkyl group which may be branched;

R$^7$ is hydrogen, an alkyl group, a hydroxyalkyl group or the group

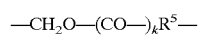

i is from 0 to 10;

k is 0 or 1.

7. The method of claim 1 where X is a bridge of the formula:

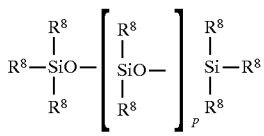

where

R$^8$ is an alkyl group, a substituted alkyl group, a phenyl radical or an R$^5$ group; and p is from 0 to 10.

* * * * *